United States Patent
Alfonso Alegre et al.

(10) Patent No.: US 10,995,176 B2
(45) Date of Patent: *May 4, 2021

(54) METHOD FOR OBTAINING BIODEGRADABLE POLYMERS

(71) Applicant: SOCIEDAD ANONIMA MINERA CATALANO-ARAGONESA, Saragossa (ES)

(72) Inventors: Maria Jose Alfonso Alegre, Saragossa (ES); Patricia Zagalaz Lasierra, Saragossa (ES); Miguel Angel Caballero Lopez, Saragossa (ES)

(73) Assignee: SOCIEDAD ANONIMA MINERA CATALANO-ARAGONESA, Saragossa (ES)

( * ) Notice: Subject to any disclaimer, the term of this patent is extended or adjusted under 35 U.S.C. 154(b) by 190 days.

This patent is subject to a terminal disclaimer.

(21) Appl. No.: 16/304,029

(22) PCT Filed: May 30, 2016

(86) PCT No.: PCT/ES2016/070408
§ 371 (c)(1),
(2) Date: Nov. 21, 2018

(87) PCT Pub. No.: WO2017/207828
PCT Pub. Date: Dec. 7, 2017

(65) Prior Publication Data
US 2020/0317858 A1    Oct. 8, 2020

(51) Int. Cl.
| | | |
|---|---|---|
| *C08G 63/183* | (2006.01) | |
| *C08G 63/672* | (2006.01) | |
| *C08G 63/685* | (2006.01) | |
| *C08G 63/80* | (2006.01) | |
| *C08G 69/46* | (2006.01) | |

(52) U.S. Cl.
CPC ......... *C08G 63/183* (2013.01); *C08G 63/672* (2013.01); *C08G 63/685* (2013.01); *C08G 63/80* (2013.01); *C08G 69/46* (2013.01); *C08G 2230/00* (2013.01)

(58) Field of Classification Search
USPC ........................................ 528/196, 198, 302
See application file for complete search history.

(56) References Cited

U.S. PATENT DOCUMENTS

| | | | | |
|---|---|---|---|---|
| 8,614,280 | B2 * | 12/2013 | Witt | C08G 63/127 525/437 |
| 2004/0236063 | A1 * | 11/2004 | Suzuki | C08J 3/12 528/275 |
| 2006/0052504 | A1 | 3/2006 | Xia | |
| 2012/0088898 | A1 | 4/2012 | Schoennagel | |
| 2014/0128514 | A1 | 5/2014 | Witt et al. | |
| 2015/0087034 | A1 * | 3/2015 | Utsunomiya | C08G 63/78 435/135 |
| 2015/0087789 | A1 * | 3/2015 | Utsunomiya | C08G 18/4213 525/424 |

FOREIGN PATENT DOCUMENTS

| | | |
|---|---|---|
| EP | 2252642 B1 | 10/2012 |
| EP | 2628761 A1 | 8/2013 |
| ES | 2263492 T3 | 12/2006 |
| ES | 2537656 T3 | 5/2015 |
| JP | 2004204027 A | 7/2004 |
| KR | 920000314 B1 | 1/1992 |
| WO | 2005035608 A2 | 4/2005 |

OTHER PUBLICATIONS

International Search Report for corresponding PCT application PCT/ES2016/070408, dated Feb. 3, 2017.

* cited by examiner

*Primary Examiner* — Terressa Boykin
(74) *Attorney, Agent, or Firm* — Notaro, Michalos & Zaccaria P.C.

(57) ABSTRACT

Method for obtaining biodegradable polymers that has a stage of esterification and/or transesterification and amidation reaction, a stage of prepolycondensation, a stage of polycondensation, a stage of extraction and a stage of drying, eliminating the use of chain extenders. The polymer can achieve all the range of viscosities desired and with an improved colour compared to the polymer from other methods, where chain extenders are used, provide a more efficient process, that is environmentally cleaner and safer for the operatives.

9 Claims, 1 Drawing Sheet

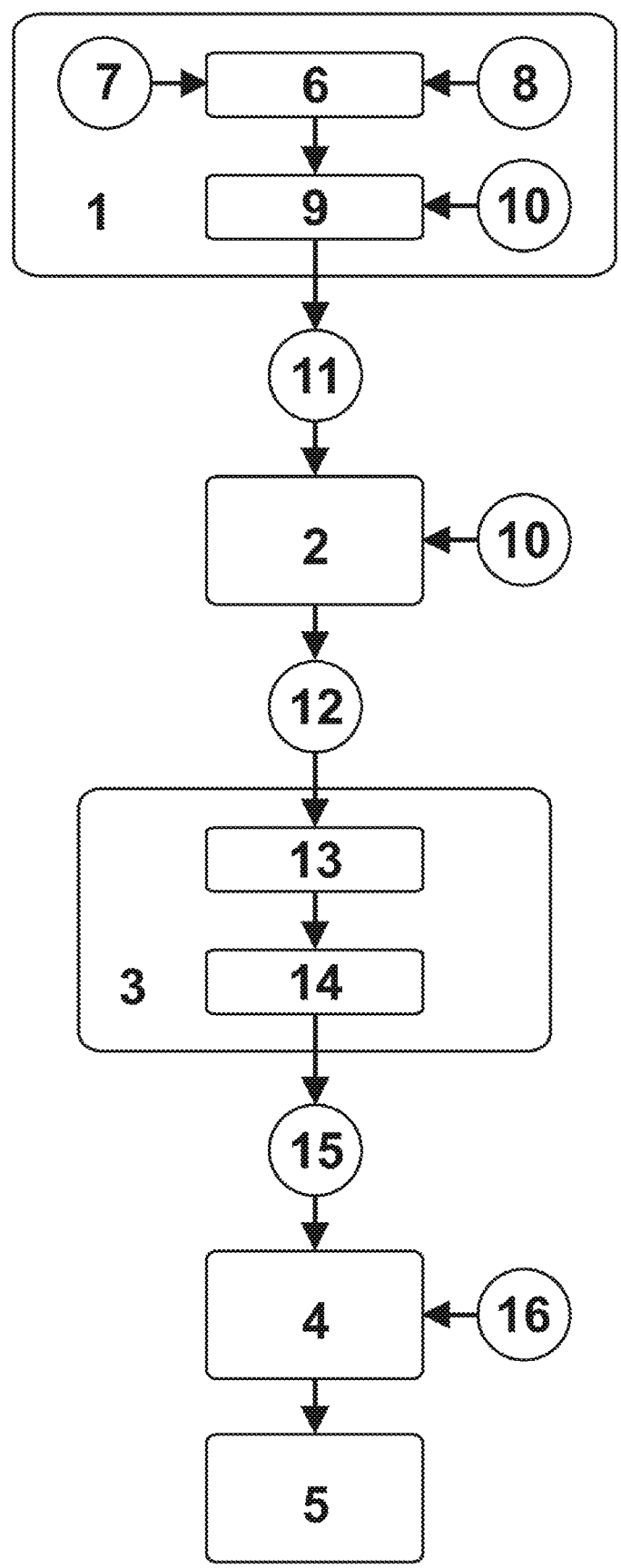

METHOD FOR OBTAINING BIODEGRADABLE POLYMERS

This descriptive specification refers, as the title indicates, to a method for obtaining biodegradable polymers that comprises a stage of esterification and/or transesterification and amidation reaction, a stage of prepolycondensation, a stage of polycondensation, a stage of extraction and a stage of drying, eliminating in this way the use of chain extenders, which are often used when these polymers are produced.

FIELD OF THE INVENTION

The invention is in the field of methods for obtaining biodegradable polymers based on aliphatic or aliphatic and aromatic dicarboxylic acids and aliphatic dihydroxy compounds such as biodegradable polyesteretheramide.

BACKGROUND OF THE INVENTION

There are many well-known methods for obtaining biodegradable polymers. These processes suffer from the problem of the use of chain extender compounds in one or several stages. These chain extenders present a multitude of problems and drawbacks as they are generally not environmentally friendly chemical compounds, therefore many precautions must be taken for their safe handling. These compounds also have limitations in food contact applications because of their level of toxicity.

The most typical chain extenders are the diisocyanates. Isocyanates are highly toxic because of the high reactivity of the isocyanate group. The most toxic isocyanates are those with high vapour pressures that because of their volatility can be inhaled into the respiratory tract such as the case of methyl isocyanate, the main agent of the Bhopal disaster in a pesticide factory in India.

In the case of HDI (hexamethylene diisocyanate), a type of chain extender, the use of a suitable gas mask is indispensable. Contact with the skin can cause irritation and inhalation can give rise to respiratory problems and even allergy. The use of a full protective suit, glasses, gloves and/or masks is essential, which must be disposed of properly.

The safety sheets of other common chain extenders such as glycidyl acrylic copolymers (for example Joncryl ADR 4300, 4368 or 4380) mention hazards such as toxicity, carcinogenicity and risks to fertility.

On the other hand, production processes are known on the market that include a process of extraction through washing with water, which is a common practice for some polyamides such as PA6, as found in Patents KR920000314 "Manufacturing process of full aromatic polyamide fiber", JP2004204027 "Continuous production process of polyamide", ES2537656 "Procesos de purificación y secado de hidrogeles de polímeros" or ES2263492 "Procedimiento para producir fibra de poliamida meta-aromática", but these production processes have never been used for producing biodegradable polymers.

The new method described here includes a stage of extraction through washing with water in order to obtain biodegradable polymers. As far as we know, this option of extraction, which provides evident advantages compared to the processes already described and used, has not been previously described.

DESCRIPTION OF THE INVENTION

To solve the existing problems of the use of chain extenders in the production of biodegradable polymers, a method of obtaining them has been devised that is the object of this invention. The process comprises various sequential stages: a stage of esterification and/or transesterification and amidation, a stage of prepolicondensation, a stage of polycondensation to low, medium or high viscosity, a stage of extraction and a stage of drying, eliminating in this way the use of chain extenders.

All the information referring to examples of modes of embodiment, including the tables and figures, form part of the description of the invention. In particular, the detail of each phase is referenced in the preferred embodiment of the invention.

Advantages of the Invention

This method for obtaining biodegradable polymers, those based on aliphatic or aliphatic and aromatic dicarboxylic acids and aliphatic dihydroxy compounds, that is presented here brings multiple advantages over the processes currently known and used. The main advantage is that the polymer so obtained can achieve all the desired range of viscosities without the need to add chain extenders.

Another additional advantage is the fact that the polymer obtained has an improved colour compared to the polymer from other processes where chain extenders are not used. Improved colour is defined as when the common orange tone in the polymer made with processes where chain extenders are not used is reduced or even disappears. The final polymer obtained with this invention is beige in colour or almost white, more commercially valued by the market.

Another important advantage in the elimination of chain extenders is that the risks of toxicity and pollution are removed, both for the production plant staff and for the environment, with the additional effect of avoiding the use of irritating protective equipment by these staff.

It is also important to highlight the additional advantage from the point of view of economic efficiency of the production process, which means that by not using chain extenders, the use of a reagent that is commonly added to 0.5-2% by weight of the final product is saved, with the consequent financial saving.

Another notable advantage is that the polymers obtained may be used in food contact applications, because this enables obtaining much safer products, because chain extenders have limitations in food contact applications due to their toxicity.

And last but not least, the use of this process enables reducing the cost of commissioning the plant and its energy consumption during the production process because in conventional methods that add chain extenders continuously, dynamic mixers or extruders are required, whose energy consumption is very high, approximately 10-20% of the consumption of the polymerisation plant. Installing these systems to continuously add chain extenders to an industrial plant gives rise to a more complex facility to design and operate, where complex and sophisticated equipment must be duplicated, and more control and measurement systems installed. The implementation of an extraction system with water at moderate temperature and subsequent drying is, in terms of design and operation, much simpler and energetically more efficient than the conventional use of chain extenders for increasing the viscosity.

DESCRIPTION OF THE FIGURES

In order to better understand the object of this invention, the diagram attached represents a preferred practical embodiment of the method for obtaining biodegradable polyesteretheramide.

FIG. 1 shows a simplified block diagram of the method.

PREFERRED EMBODIMENT OF THE INVENTION

The method for obtaining biodegradable polymers of this invention belonging to the class of methods based on aliphatic or aliphatic and aromatic dicarboxylic acids and aliphatic dihydroxy compounds, comprises, as shown in the attached plan, various sequential stages:
A first reaction stage of esterification and/or transesterification and amidation (1),
a second stage of prepolycondensation (2),
a third stage of polycondensation (3),
a fourth stage of extraction (4) and
a fifth stage of drying (5).

The first reaction stage of esterification and/or transesterification and amidation (1) comprises a first step (6) in which the raw materials (7) and other additives (8) are mixed in a paste-mixing tank and a second step (9) of continuous feed to a reactor with the raw materials already previously mixed and, optionally, a catalyst and other additives (10) in an esterification and/or transesterification and amidation reactor, obtaining an oligomer (11), with oligomer being understood as the already-reacted raw materials and other additives such as stabilizers, antioxidants, colour correctors, branching agents and other monomers.

The second stage of prepolycondensation (2) comprises continuous feed of the already-reacted raw materials or oligomer and optionally more catalyst and other additives (10) to a prepolycondensation reactor, obtaining a prepolymer (12).

The third stage of polycondensation (3) comprises a first step (13) of continuous feed with prepolymer to a polycondensation reactor obtaining a polymer with intrinsic viscosities in the range of 0.65 to 2.2 dl/g (60 to 320 cm$^3$/g according to DIN 53728) and a second step (14) in which the melted polymer is cooled and cut, converting it into polymer chippings (15).

The fourth stage of extraction (4) comprises washing the previously obtained polymer chippings (15) using water (16), which is preferably at a temperature of between 40° C. and 98° C. for a time preferably between 2 hours and 24 hours.

An expert in the art will understand that the range between 2 hours and 24 hours includes 4, 6, 8, 10, 12, 14, 16, 18, 20 and 22 hours as well as that the range between 40° C. and 98° C. includes 50° C., 60° C., 70° C., 80° C. and 90° C.

This stage of extraction can be of two types: continuous or discontinuous. In the continuous extraction stage, there is a continuous inflow and outflow of polymer (15) and of water (16), while in the discontinuous extraction stage, the polymer (15) and the water (16) are loaded into a container and held in contact for a time and then the water is completely refreshed (16), the cycle being repeated various times.

The fifth stage of drying (5) comprises the drying of the polymer from the extraction stage until achieving levels of moisture of below 500 ppm and levels of tetrahydrofuran (THF) below 80 ppm.

The expert in the art will easily understand that the characteristics of different embodiments can be combined with characteristics of other possible embodiments whenever such a combination is technically possible.

A series of experimental examples obtained during the tests of the process is provided below.

For the experimental execution of these examples, a facility with four tanks connected in cascade was used, the first being the paste mixer tank with stirring. The next three were the three reactors (esterification, prepolycondensation and polycondensation), which were tanks with stirring, sleeved, capable of withstanding a pressure of 5 bar and a vacuum, with a system for extraction and condensation of volatiles.

Start-Up of the Plant

The esterification reactor was heated to 240° C., 98 kg of 1-4-butanediol (BDO), 62.5 kg of terephthalic acid (TPA) and 66.8 kg of adipic acid (ADA) were added through the paste-stirrer and allowed to react for 4 hours while water was allowed to escape through the distillation column. When the temperature of the column head started to reduce, the reaction was considered finished. Part of the product was discharged until approximately 100 kg remained inside the esterification reactor. This is called the "mother paste", to which the raw materials and additives were continuously added hereafter.

Example 1

To the paste-mixer were added 62.5 kg PTA, 66.8 kg ADA, 96 kg BDO, 6 kg polyethertriamine and 1 kg sodium sulfoisophthalic acid (SSIPA). They were mixed for 1 hour and 93 kg/h of the mixture was continuously passed to the esterification reactor, which contained 100 kg of the previously prepared mother paste at 240° C. and 400 mbar. In the esterification reactor, a flow of catalyst was added at 72 g/hour of tetrabutyl titanate (TNBT) at the top and a flow of 115 g/h of triethyl phosphate (TEP) through the side.

The raw materials were input continuously and the product (monomer or oligomer) flowed out at 72 kg/h and water and other volatiles through the column head.

The product obtained is continuously input, at the same time as 24 g/h TNBT to a prepolycondensation reactor operating at 240° C. and 60 mbar, and a prepolymer is continuously obtained, which was input into the polycondensation reactor operating at 240° C. and 1-2 mbar It is maintained for a residence time of 3 hours and a polymer was obtained with the following properties:
Intrinsic viscosity of 1.19 dl/g.
Melt Volume Rate (MVR) (190° C./2.16 kg) of 20.58 cc/10 min.
CIELAB colour: L*a*b* of 76.6/8.4/18.9.

Example 2

To the paste-mixer are added 65 kg PTA, 63 Kg ADA, 96 kg BDO, 3 kg polyethertriamine and 1.5 kg SSIPA. They are mixed for 1 hour and 93 kg/h of the mixture is continuously passed to the esterification reactor, which contained 100 kg of the previously prepared mother paste at 240° C. and 400 mbar. In the esterification reactor, a flow of 72 g/h of TNBT was added.

The raw materials are input continuously and the product (monomer or oligomer) flowed out at 70 kg/h and water and other volatiles through the column head.

The product obtained is continuously input, at the same time as 24 g/h TNBT to a prepolycondensation reactor operating at 240° C. and 60 mbar, and a prepolymer is continuously obtained, which is input into the polycondensation reactor operating at 240° C. and 1-2 mbar. It is maintained for a residence time of 2 hours and a polymer was obtained with the following properties:
Intrinsic viscosity of 1.15 dl/g.
Melt Volume Rate (MVR) (190° C./2.16 kg) of 16.10 cc/10 min.
CIELAB colour: L*a*b* of 72.5/19.5/22.8.

Example 3

To the paste-mixer are added 68 kg PTA, 61.8 kg ADA, 96 kg BDO, 7.5 kg polyethertriamine and 1.5 kg SSIPA. They are mixed for 1 hour and 93 kg/h of the mixture is continuously passed to the esterification reactor, which contained 100 kg of the previously prepared mother paste at 240° C. and 400 mbar. In the esterification reactor, a flow of 82 g/h of TNBT is added.

The raw materials are continuously input and the product (monomer or oligomer) flowed out at 72 kg/h and water and other volatiles through the column head.

The product obtained is continuously input, at the same time as 33 g/h TNBT to a prepolycondensation reactor operating at 240° C. and 60 mbar, and a prepolymer is continuously obtained, which is input into the polycondensation reactor operating at 240° C. and 1-2 mbar. It is maintained for a residence time of 4.5 hours and a polymer is obtained with the following properties:

Intrinsic viscosity 1.47 dl/g.

Melt Volume Rate (MVR) (190° C./2.16 kg) of 3.94 cc/10 min.

CIELAB colour: L*a*b* de 70.6/12.0/20.5.

Example 4

The results of the experimental trials of the extraction stage are shown in the tables below for each experimental series, both with regard to viscosity and to other important parameters. The biodegradable polyesteretheramide is abbreviated as PEEA for convenience in these tables.

When PEEA of high viscosity is produced in the reaction, generally the colour of the polymer is orange in tone. Common CIELAB colour values L*a*b* are in the range: (63-84), (5-20), (14-27), in particular, values of a* higher than 5 give an orange tone to the polymer.

TABLE 1

Study of the change in colour of PEEA. Series 1.

| | L* | a* | b* | MVR (cc/10 min) | Moisture (ppm) | Viscosity Intrinsic (dl/g) |
|---|---|---|---|---|---|---|
| PEEA, Example 1 | 76.57 | 8.44 | 18.94 | 20.58 | 884 | 1.19 |
| PEEA, Example 1. Stage of discontinuous extraction + final drying. 500 g PEEA in a container + 1 l water at T 100° C. After 2 hours, the water was renewed and repeated 4 times. TOTAL 8 hours. Drying at 65° C., 15 h | 81.52 | 0.13 | 15.2 | 2,113.12 | 1155 | 0.52 |
| PEEA, Example 1. Only drying in vacuum, with N₂ at 90° C. Placed in a vacuum oven with N₂ at 90° C., 15 h | 77.34 | 6.97 | 17.71 | 20.56 | 734 | 1.18 |

With an extraction at 100° C. for 8 hours, the value of a* was almost reduced to zero but the viscosity fell to one third. Only with a drying at 90° C. in nitrogen, the viscosity was not affected but the value of a* was barely reduced.

TABLE 2

Tests on PEEA extraction. Series 2.

| | L* | a* | b* | MVR (cc/10 min) | Moisture (ppm) |
|---|---|---|---|---|---|
| PEEA, Example 1 | 76.57 | 8.44 | 18.94 | 20.58 | 884 |
| PEEA, Example 1. Stage of discontinuous extraction + drying T 50° C. After 2 hours, the water was renewed. TOTAL 2 h. | 77.78 | 6.24 | 16.58 | 24.43 | 1309 |
| PEEA, Example 1. Stage of discontinuous extraction + drying T 50° C. After 2 hours, the water was renewed and repeated 1more time. TOTAL 4 hours. | 77.83 | 6.03 | 16.61 | 24.59 | 1799 |
| PEEA, Example 1. Stage of discontinuous extraction + drying T 50° C. After 2 hours, the water was renewed and repeated 2 more times. TOTAL 6 hours. | 77.9 | 5.9 | 16.41 | 25.65 | 1780 |
| PEEA, Example 1. Stage of discontinuous extraction + drying T 50° C. After 2 hours, the water was renewed and repeated 3 more times. TOTAL 8 hours. | 77.86 | 5.97 | 46.69 | 23.66 | 1722 |
| PEEA, Example 1. Stage of discontinuous extraction + drying T 50° C. After 2 hours, the water was renewed and repeated 4 times more. TOTAL 10 hours. | 78.17 | 5.98 | 16.55 | 23.74 | 1804 |
| PEEA, Example 1. Stage of discontinuous extraction + drying T 50° C. After 2 hours, the water was renewed and repeated 7 more times. TOTAL 16 hours. | 78.3 | 4.54 | 16.47 | 24.48 | 1933 |

In series 2, 500 g PEEA of Example 1 were taken, placed in contact with 1 litre of water and applied at 50° C. for the time indicated with the renewal indicated. Finally, the chippings were dried at 65° C. for 15 hours. It was found that with an extraction at 50° C., the value of a* was slightly reduced and the fluidity (MVR) only increased slightly.

TABLE 3.

Tests of PEEA extraction. Series 3.

|  | L* | a* | b* | MVR (cc/10 min) | Moisture (ppm) | Viscosity Intrinsic (dl/g) |
|---|---|---|---|---|---|---|
| PEEA, Example 1 | 76.57 | 8.44 | 18.94 | 20.58 | 884 | 1.16 |
| PEEA, Example 1. Stage of discontinuous extraction + drying T 70° C. After 2 hours, the water is renewed. TOTAL 2 h. | 78.61 | 4.47 | 16.56 | 20.19 | 654 | 1.11 |
| PEEA, Example 1. Stage of discontinuous extraction + drying T 70° C. After 2 hours, the water is renewed and repeated 1 more time TOTAL 4 hours. | 79.64 | 3.85 | 16.45 | 20.46 | 797 | 1.11 |
| PEEA, Example 1. Stage of discontinuous extraction + drying T 70° C. After 2 hours, the water is renewed and repeated 2 more times TOTAL 6 hours. | 7914 | 2.79 | 16.58 | 23.62 | 704 | 1.12 |
| PEEA, Example 1. Stage of discontinuous extraction + drying T 70° C. After 2 hours, the water is renewed and repeated 3 more times TOTAL 8 hours. | 80.5 | 2.0 | 16.39 | 26.95 | 839 | 1.08 |

In series 3, 500 g PEEA of Example 1, were taken, placed in contact with 1 litre of water and applied at 70° C. for the time indicated with the renewal indicated. Finally, the chippings were dried at 65° C. for 15 hours. It was found that with an extraction at 70° C., the value of a* was reduced and the fluidity (MVR) increased only slightly.

TABLE 4

Tests of PEEA extraction. Series 4.

|  | L* | a* | b* | MVR (cc/10 min) | Moisture (ppm) | Viscosity Intrinsic (dl/g) |
|---|---|---|---|---|---|---|
| PEEA, Example 2. | 72.5 | 19.5 | 22.8 | 16.10<br>17.90 | 614<br>980 | 1.15 |
| PEEA, Example 2 Stage of discontinuous extraction + drying T 100° C. After 2 hours, the water is renewed and repeated 4 times TOTAL 8 hours. | 84.12 | 1.9 | 19.02 | 749.48 | 1207 | 0.57 |
| PEEA, Example 2. Stage of discontinuous extraction + drying T 50° C. After 2 hours, the water is renewed. TOTAL 2 hours. | 73.2 | 18.21 | 19.77 | 18.92 | 1468 | |
| PEEA, Example 2. Stage of discontinuous extraction + drying T 50° C. After 2 hours, the water is renewed and repeated 1 more time TOTAL 4 hours. | 74.31 | 17.1 | 19.32 | 4.15 | 1473 | |
| PEEA, Example 2. Stage of discontinuous extraction + drying T 50° C. After 2 hours, the water is renewed and repeated 2 more times TOTAL 6 hours. | 73.83 | 17.95 | 19.69 | 11.08 | 1487 | |
| PEEA, Example 2. Stage of discontinuous extraction + drying T 50° C. After 2 hours, the water is renewed and repeated 3 more times TOTAL 8 hours. | 74.26 | 16.67 | 19.48 | 15.17 | 1554 | |
| PEEA, Example 2. Stage of discontinuous extraction + drying T 50° C. After 2 hours, the water is renewed and repeated 4 times más TOTAL 10 hours. | 74.53 | 16.76 | 19.55 | | | |
| PEEA, Example 2. Stage of discontinuous extraction + drying T 50° C. After 2 hours, the water is renewed and repeated 7 more times TOTAL 16 hours. | 74.27 | 15.5 | 19.65 | 15.51 | | |

In series 4, 500 g PEEA of Example 2, were taken, placed in contact with 1 litre of water and applied at 100° C. or 50° C. for the time indicated with the renewal indicated. Finally, the chippings were dried at 65° C. for 15 hours. It was found that in this polymer with an elevated a*, with extraction at 100° C. for 8 hours, the value of a* was reduced significantly and the viscosity fell drastically. However, in this polymer with high a* colour, with an extraction at 50° C., the value of a* reduced slightly and the fluidity (MVR) remained the same.

semi-continuous extraction at 70° C., the value of a* was considerably reduced and the viscosity fell slightly.

In these experimental trials, it was verified that a polymer was obtained with an improved colour after the extraction stage (4), an improvement in colour meaning that the usual orange tone of conventional production processes reduced or even disappeared, giving rise to a final polymer with a less orange colour, in beige tones, more acceptable to the market.

In the experimental trials, it was verified that after the extraction stage (4) at moderate temperatures, there was no

TABLE 5

Tests of PEEA extraction. Series 5.

| | L* | a* | b* | MVR (cc/10 min) | Moisture (ppm) | Viscosity Intrinsic (dl/g) |
|---|---|---|---|---|---|---|
| PEEA, Example 2. | 72.5 | 19.5 | 22.8 | 20.5 | 614 | 1.15 |
| PEEA, Example 2. Stage of discontinuous extraction + drying T 70° C. After 2 hours, the water was renewed. TOTAL 2 hours. | 75.98 | 14.18 | 18.92 | 20.2 | 654 | 1.12 |
| PEEA, Example 2. Stage of discontinuous extraction + drying T 70° C. After 2 hours, the water was renewed and repeated 1 more time TOTAL 4 hours. | 75.34 | 13.08 | 19.45 | 20.4 | 797 | 1.11 |
| PEEA, Example 2. Stage of discontinuous extraction + drying T 70° C. After 2 hours, the water was renewed and repeated 2 more times. TOTAL 6 hours. | 77.07 | 11.23 | 20.01 | 23.6 | 664 | 1.12 |
| PEEA, Example 2. Stage of discontinuous extraction + drying T 70° C. After 2 hours, the water is renewed and repeated 3 more times. TOTAL 8 hours. | 78.01 | 10.56 | 19.85 | 26.95 | 839 | 1.08 |

In series 5, 500 g PEEA of Example 2, were taken, placed in contact with 1 litre of water and applied at 70° C. for the time indicated with the renewal indicated. Finally, the chippings were dried at 65° C. for 15 hours. It was found that in this polymer, with elevated a* colour, with an extraction at 70° C., the value of a* was considerably reduced and the viscosity only fell slightly.

fall in viscosity, therefore this method is compatible with any desired viscosity. In terms of the MVR according to ISO 1133 at 190° C./2.16 kg, the method enables obtaining a polymer with a viscosity in the range between 3 and 50 cc/10 min.

Experimental trials were also performed on the biodegradation of the polyesteretheramide obtained, and the results

TABLE 6

Tests of PEEA extraction. Series 6.

| | L* | a* | b* | MVR (cc/10 min) | Moisture (ppm) | Viscosity Intrinsic (dl/g) |
|---|---|---|---|---|---|---|
| PEEA, Example 3. | 70.6 | 12 | 20.5 | 3.94 | 534 | 1.47 |
| PEEA, stage of Semi-continuous extraction with CONTINUOUS RENEWAL of water at 70° C. TOTAL 2 hours. | 74.7 | 8.3 | 22.8 | 4.3 | 125 | 1.46 |
| PEEA Example 3, stage of Semi-continuous extraction with CONTINUOUS RENEWAL of water at 70° C. Total 4 hours | 75.4 | 7.7 | 23.3 | 4.6 | 703 | 1.44 |
| PEEA Example 3, stage of Semi-continuous extraction with CONTINUOUS RENEWAL of water at 70° C. TOTAL 6 hours. | 76.3 | 7.2 | 23.4 | 4.6 | 119 | 1.43 |

In series 6, 4 kg PEEA of Example 3 were taken, placed in contact with 8 litres of water and applied at 70° C. for the time indicated and with constant renewal of water. Finally, the chippings were dried at 65° C. for 15 hours. It was found that in this polymer with a moderate value of a*, with a are shown in Example 5. The definition and methods of measurement of biodegradation specified in the UNE-EN 13432 standard were used.

According to UNE-EN 13432, biodegradability is considered to be the decomposition of an organic chemical compound by microorganisms in the presence of oxygen to give carbon dioxide, water, mineral salts of any other element present (mineralisation) and new biomass; or, in the absence of oxygen to give carbon dioxide, methane, mineral salts and new biomass.

The UNE-EN 13432 refers to containers and packaging that are valorised by composting and biodegradation. For a container or packaging, or the material of a container of packaging or a component of a container or packaging to be considered organically biodegradable according to UNE-EN 13432, 90% of total biodegradation or 90% of maximum biodegradation must have been completed in six months to a suitable reference substance (normally microcrystalline cellulose powder).

According to the UNE-EN 13432 standard, only those laboratory assays of biodegradation that provide unequivocal information on the final and inherent biodegradability of a material or container or packaging or its major organic component must be used.

Point 6 of the UNE-EN 13432 standard (Requirements of containers and packaging that can be valorised through composting and biodegradability) indicates that the controlled aerobic composting test, described in the ISO 14855: 1999 standard (Determination of the aerobic biodegradability in plastic materials under controlled composting conditions) must be used if it is not inappropriate for the type and properties of the material under test.

Example 5

The polymer obtained in Example 1 and Example 3 was subjected to aerobic biodegradation test according to ISO 14855:1999.

80 g PEEA obtained in Examples 1 and 3 were crushed to a powder of particle size less than 200 µm and each mixed with 480 g of compost. They were incubated at 58° C. for 180 days. A reference of microcrystalline cellulose was prepared in the same way (REF: 310697-500G).

2-litre containers were used with perforated bottoms through which humidified air was constantly passed. The humidity of the compost was maintained at 50%. Three (3) replicas were prepared and sampled from each sample. The concentration of $CO_2$ generated by the reaction of the microbes was measured each day by acid-base titration. The following table shows the results of the biodegradation of PEEA of Examples 1 and 3 and of the reference.

|  | Mean % Biodegradability calculated from generated CO2 | Mean % Biodegradability calculated from the weight of organic matter | Test Duration |
| --- | --- | --- | --- |
| Example 1 | 99.85 (176 days) | 98.89 | 180 days |
| Example 3 | 99.56 (179 days) | 98.62 | 180 days |
| Reference | 99.63 (111 days) | 98.8 | 180 days |

The invention claimed is:

1. Method for obtaining biodegradable polymers, based on aliphatic, or aliphatic and aromatic dicarboxylic acids and aliphatic dihydroxy compounds, characterised in that it comprises a first stage of esterification and/or transesterification and amidation (1) reaction, obtaining an oligomer (11), a second stage of prepolycondensation (2), obtaining a prepolymer (12), a third stage of polycondensation (3), obtaining the polymer in chippings (15), a fourth stage of extraction (4), comprising washing with water (16) of the obtained polymer chippings (15) and a fifth stage of drying (5).

2. Method for obtaining biodegradable polymers of claim 1 characterised in that the first stage of esterification and/or transesterification and amidation reaction (1) comprises a first step (6) in which the raw materials described (7) and other additives (8) are mixed in a paste-mixer tank, and a second step (9) of continuous feed to the reactor of the previously mixed raw materials and optionally catalyst and other additives (10) to an esterification and/or transesterification and amidation reactor.

3. Method for obtaining biodegradable polymers according to claim 1 characterised in that the second stage of prepolycondensation (2) comprises the continuous feed of the already reacted raw materials or oligomer (11) and optionally more catalyst and other additives (10) to a prepolycondensation reactor.

4. Method for obtaining biodegradable polymers according to claim 1 characterised in that the third stage of polycondensation (3) comprises a first step (13) of continuous feed of prepolymer to a polycondensation reactor, obtaining a polymer with intrinsic viscosities in the range of 0.65 to 2.2 dl/g (60 to 320 cm3/g according to DIN 53728) and a second step (14) in which this melted polymer is cooled and cut, converting it into chippings (15).

5. Method for obtaining biodegradable polymers according to claim 1 characterised in that the water (16) used in the fourth stage of extraction (4) is at a temperature of between 40° C. and 98° C.

6. Method for obtaining biodegradable polymers according to claim 1 characterised in that the duration of the fourth stage of extraction (4) is between 2 hours and 24 hours.

7. Method for obtaining biodegradable polymers according to claim 1 characterised in that the fourth stage of extraction (4) is continuous, with continuous inflow and outflow of water (16) and of polymer (15).

8. Method for obtaining biodegradable polymers according to claim 1 characterised in that the fourth stage of extraction (4) is discontinuous, loading the polymer (15) and the water (16) into a container, keeping them in contact for a time and then completely renewing the water (16) and repeating this cycle several times.

9. Method for obtaining biodegradable polymers according to claim 1 characterised in that the fifth stage of drying (5) comprises the drying of the polymer (15) from the stage of extraction until reaching humidity levels of less than 500 ppm of humidity and levels of tetrahydrofuran (THF) of less than 80 ppm.

* * * * *